US008920964B2

(12) United States Patent
Yoon et al.

(10) Patent No.: US 8,920,964 B2
(45) Date of Patent: Dec. 30, 2014

(54) RECHARGEABLE BATTERY

(75) Inventors: Seok-Joon Yoon, Yongin-si (KR);
Soo-Youn Maeng, Yongin-si (KR);
Kwang-Sik Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 6 days.

(21) Appl. No.: 12/906,045

(22) Filed: Oct. 15, 2010

(65) Prior Publication Data
US 2011/0269013 A1 Nov. 3, 2011

Related U.S. Application Data

(60) Provisional application No. 61/330,841, filed on May 3, 2010.

(51) Int. Cl.
*H01M 2/02* (2006.01)
*H01M 2/04* (2006.01)
*H01M 2/12* (2006.01)

(52) U.S. Cl.
CPC .......... *H01M 2/1241* (2013.01); *H01M 2/0207* (2013.01)
USPC ............................ 429/176; 429/163; 429/175

(58) Field of Classification Search
USPC .......................................... 429/176, 163, 175
See application file for complete search history.

(56) References Cited

U.S. PATENT DOCUMENTS

| 5,976,728 | A | 11/1999 | Yamamoto et al. | |
|---|---|---|---|---|
| 6,838,206 | B2 * | 1/2005 | Kim et al. ....................... | 429/56 |
| 6,964,690 | B2 | 11/2005 | Goda et al. | |
| 2005/0181272 | A1 * | 8/2005 | Kim ................................. | 429/56 |
| 2007/0145098 | A1 * | 6/2007 | Lee et al. ....................... | 228/101 |
| 2009/0305114 | A1 * | 12/2009 | Yeo ................................ | 429/56 |
| 2010/0143770 | A1 * | 6/2010 | Onnerud et al. ................ | 429/50 |

FOREIGN PATENT DOCUMENTS

| CN | 1181637 A | 5/1998 |
|---|---|---|
| CN | 101604759 A | 12/2009 |
| EP | 1 258 931 A1 | 11/2002 |
| EP | 2 133 934 A1 | 12/2009 |
| JP | 2001-143664 | 5/2001 |
| JP | 2001-307707 | 11/2001 |
| JP | 2001-345083 | 12/2001 |
| JP | 2004-79330 A | 3/2004 |
| JP | 2005-038773 | 2/2005 |
| JP | 2009-295576 | 12/2009 |
| JP | 2009-295582 A | 12/2009 |

(Continued)

OTHER PUBLICATIONS

Machine English Translation of JP-2005-028773.

(Continued)

*Primary Examiner* — Sean P Cullen
(74) *Attorney, Agent, or Firm* — Christie, Parker & Hale, LLP

(57) ABSTRACT

A rechargeable battery includes an electrode assembly; a can housing the electrode assembly and having an open end, a bottom surface substantially opposite to the open end, a first planar surface and a second planar surface, wherein the first planar surface and the second planar surface each have a first fracture portion that facilitates buckling of the can under compression, wherein a first axis is defined extending from the bottom surface to the open end, and wherein the first fracture portion extends along a second axis in a direction substantially perpendicular to the first axis; and a cap plate sealing the open end of the can.

14 Claims, 18 Drawing Sheets

(56) References Cited

FOREIGN PATENT DOCUMENTS

| KR | 1020030043407 | 6/2003 |
| KR | 10-2006-0102753 | 9/2006 |
| KR | 10-2009-0127701 | 12/2009 |
| WO | WO 01/61770 A1 | 8/2001 |

OTHER PUBLICATIONS

European Search Report dated Aug. 26, 2011, for corresponding European Patent application 10251907.1, 5 pages.

Korean Office action dated Feb. 23, 2012 issued to corresponding Application No. KR 10-2010-0106071, 8 pages.

Japanese Office action dated Nov. 20, 2012, for corresponding Japanese Patent application 2010-284774, (4 pages).

Patent Abstracts of Japan, and English machine translation of Japanese Publication 2001-143664, (6 pages).

Patent Abstracts of Japan, and English machine translation of Japanese Publication 2001-345083, (10 pages).

Patent Abstracts of Japan, and English machine translation of Japanese Publication 2009-295576, (20 pages).

SIPO Office action dated May 20, 2013, with English translation, for corresponding Chinese Patent application 201010572029.9, (14 pages).

JPO Office action dated Mar. 26, 2013, for corresponding Japanese Patent application 2010-284774, (2 pages).

English Machine Translation for JP No. 2004-079330 A, dated Mar. 11, 2004, 12 pages.

English Machine Translation for JP No. 2009-295582 A, dated Dec. 17, 2009, 20 pages.

SIPO Office action dated Nov. 15, 2013, with English translation, for corresponding Chinese Patent application 201010572029.9, (9 pages).

* cited by examiner (a)          (b)

(a)                    (b)

(a)          (b)

(a)　　　　　　　　　(b)

(a)　　　　　　　　(b)

(a)          (b)

RECHARGEABLE BATTERY

CROSS-REFERENCE TO RELATED APPLICATION

This application claims priority to and the benefit of U.S. Provisional Application No. 61/330,841 filed in the U.S. Patent and Trademark Office on May 3, 2010, the entire content of which is incorporated herein by reference.

BACKGROUND

1. Field

Embodiments of the present invention relates to a rechargeable battery.

2. Description of the Related Art

Unlike a primary battery, a rechargeable battery (i.e., a secondary battery) can be repeatedly recharged and discharged. Typical rechargeable batteries include a nickel-hydrogen battery, a lithium battery, a lithium ion battery, and the like. Rechargeable batteries may be manufactured in the form of a pack, and are commonly employed for mobile electronic devices such as cellular phones, notebook computers, and camcorders.

A rechargeable battery typically includes a jelly roll type of electrode assembly formed by winding a positive electrode and a negative electrode with a separator located therebetween in a stacked manner, a can accommodating the electrode assembly and electrolyte therein, and a cap assembly hermetically sealing an upper opening of the can.

The can is often made of aluminum or an aluminum alloy, and has a cylindrical or angular shape. When pressure acts in the direction perpendicular to a vertical direction of the angular can, that is, when a longitudinal compression occurs, a lower bottom face of the can be folded to be pushed inward to damage the electrode assembly, short circuiting the positive electrode and negative electrode. Then, the rechargeable battery may combust or explode.

The above information disclosed in this Background section is only for enhancement of understanding of the background of the invention and therefore it may contain information that does not form the prior art that is already known in this country to a person of ordinary skill in the art.

SUMMARY

Embodiments of the present invention have been made in an effort to provide a rechargeable battery that is stable even under longitudinal compression. Embodiments of the present invention have also been made in an effort to provide a rechargeable battery capable of preventing significant damage to an electrode assembly due to longitudinal compression of the battery, thus preventing or reducing the likelihood of combustion or explosion.

An exemplary embodiment of the present invention provides a rechargeable battery including an electrode assembly; a can housing the electrode assembly and having an open end, a bottom surface substantially opposite to the open end, a first planar surface and a second planar surface, wherein the first planar surface and the second planar surface each have a first fracture portion that facilitates buckling of the can under compression, wherein a first axis is defined extending from the bottom surface to the open end, and wherein the first fracture portion extends along a second axis in a direction substantially perpendicular to the first axis; and a cap plate sealing the open end of the can.

In one embodiment, the first fracture portion is a groove. Further, the first fracture portion may be proximate to the open end of the can and/or proximate to and spaced from the bottom surface of the can. Additionally, the first fracture portion on the first planar surface may substantially correspond to the first fracture portion on the second planar surface.

In one embodiment, a second fracture portion is on the first planar surface and on the second planar surface and a first fold portion on the first planar surface. The first fold portion may be spaced from at least one of the first fracture portion and the second fracture portion or may contact both fracture portions.

According to an exemplary embodiment of the present invention, because the fracture portions are provided on the front and rear faces in the vicinity of the bottom face of the can, when the can is compressed to be deformed due to a longitudinal compression, the fracture portion is buckled or fractured to make the bottom face of the can fold toward an outer side of the can, thereby preventing damage to the electrode assembly by the deformed bottom face. Therefore, the positive electrode and the negative electrode can be prevented from being short-circuited, and combustion or explosion of the rechargeable battery can be prevented.

DETAILED DESCRIPTION

Figure 1:
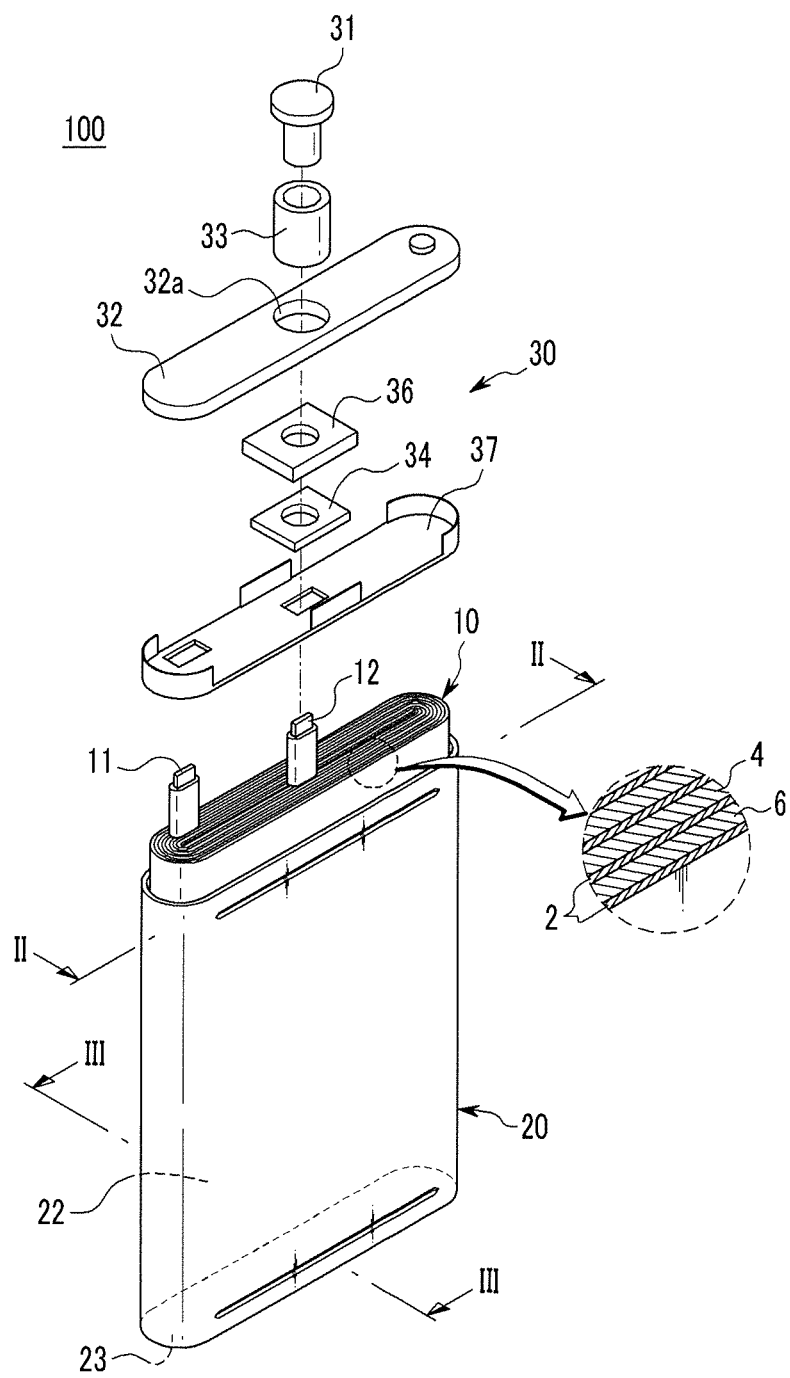
FIG. 1 is an exploded perspective view of a rechargeable battery according to a first exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
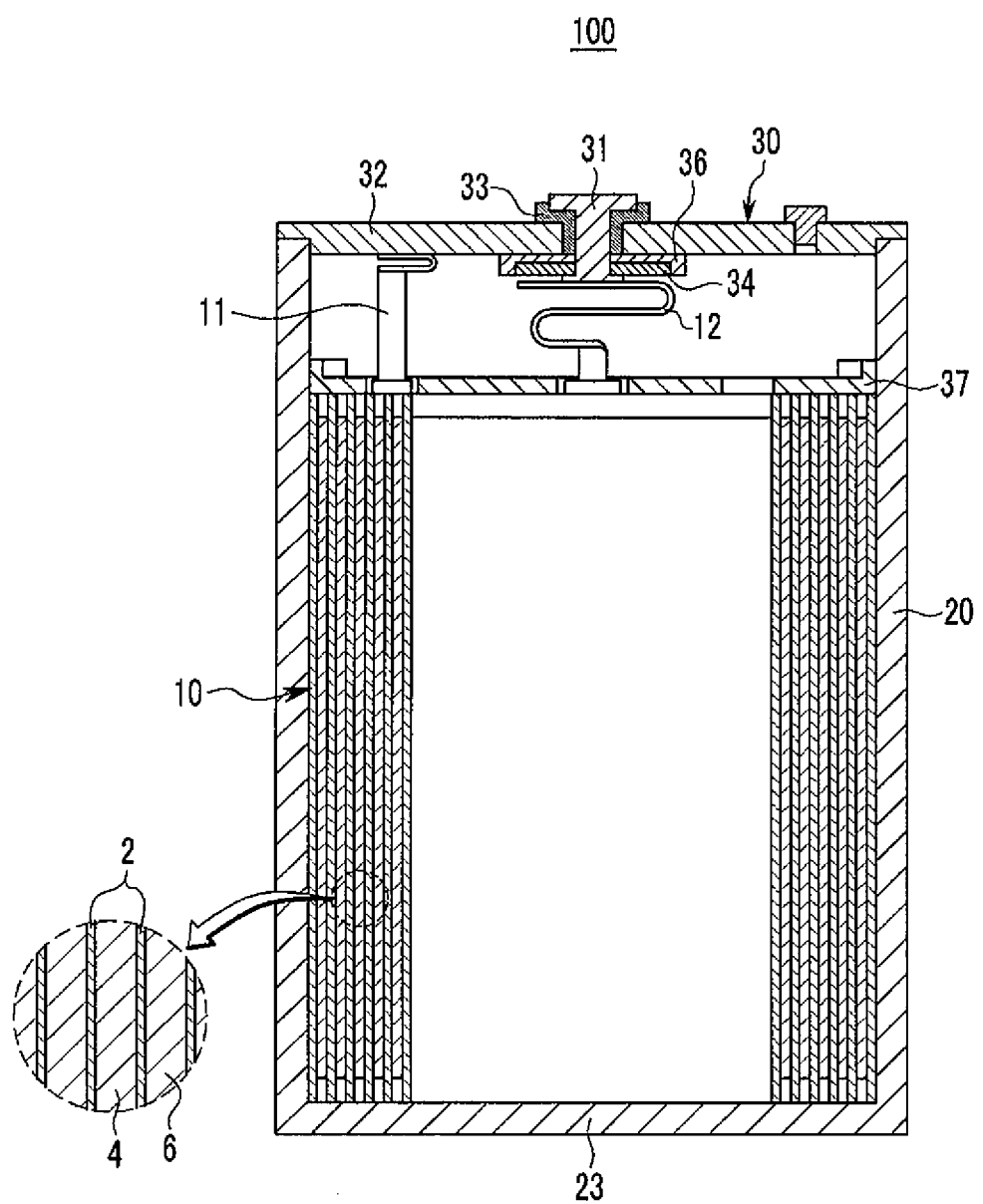
FIG. 2 is a cross-sectional view taken along line II-II in a state in which the rechargeable battery of FIG. 1 is assembled.

FIG. 1 is an exploded perspective view of a rechargeable battery according to a first exemplary embodiment of the present invention, and FIG. 2 is a cross-sectional view taken along line II-II in a state in which the rechargeable battery of FIG. 1 is assembled. With reference to FIGS. 1 and 2, a rechargeable battery 100 according to the first exemplary embodiment of the present invention includes an electrode assembly 10, a can 20 accommodating the electrode assembly 10 along with an electrolyte therein, and a cap assembly 30 hermetically sealing an opening formed at an upper end of the can 20.

The electrode assembly 10 is formed by spiral-winding a positive electrode 4 and a negative electrode 6 with a separator 2 located therebetween in the form of a jelly roll. The electrode assembly 10 has a shape generally corresponding to an internal space of the angular can 20 so as to fit into the interior of the can 20.

The can 20 receives the electrode assembly 10 through the opening formed at one side thereof, and is formed as a conductor to be able to serve as an electrode terminal. For example, the can 20 is made of aluminum or an aluminum alloy, and is electrically connected with the positive electrode 4 of the electrode assembly 10 to act as a positive terminal. In this case, an electrode terminal 31 provided to the cap assembly 30 is electrically connected with the negative electrode 6 of the electrode assembly to act as a negative terminal. Conversely, the can 20 may serve as a negative terminal, and the electrode terminal 31 may act as a positive terminal.

The cap assembly 30 includes a cap plate 32 fixed to the opening of the can 20, the electrode terminal 31 inserted into a terminal hole 32a of the cap plate 32 with an insulating gasket 33 located therebetween, a terminal plate 34 electrically connected with a lower end of the electrode terminal 31, an insulating plate 36 positioned between the cap plate 32 and the terminal plate 34, and an insulating case 37 insulating the electrode assembly 10 and the cap assembly 30. The insulating gasket 33 electrically insulates the electrode terminal 31 and the cap plate 32, and the insulating plate 36 electrically insulates the terminal plate 34 and the cap plate 32.

A positive lead 11 fixed to the positive electrode 4 of the electrode assembly 10 is welded to an inner surface of the cap plate 32 to transfer current of the positive electrode 4 to the cap plate 32 and the can 20. That is, the can 20 acts as a positive terminal. Also, a negative lead 12 fixed to the negative electrode 6 of the electrode assembly 10 is welded to a lower surface of the terminal plate 34 to transfer current of the negative electrode 6 to the terminal plate 34 and the electrode terminal 31. That is, the electrode terminal 31 acts as a negative terminal.

Figure 3:
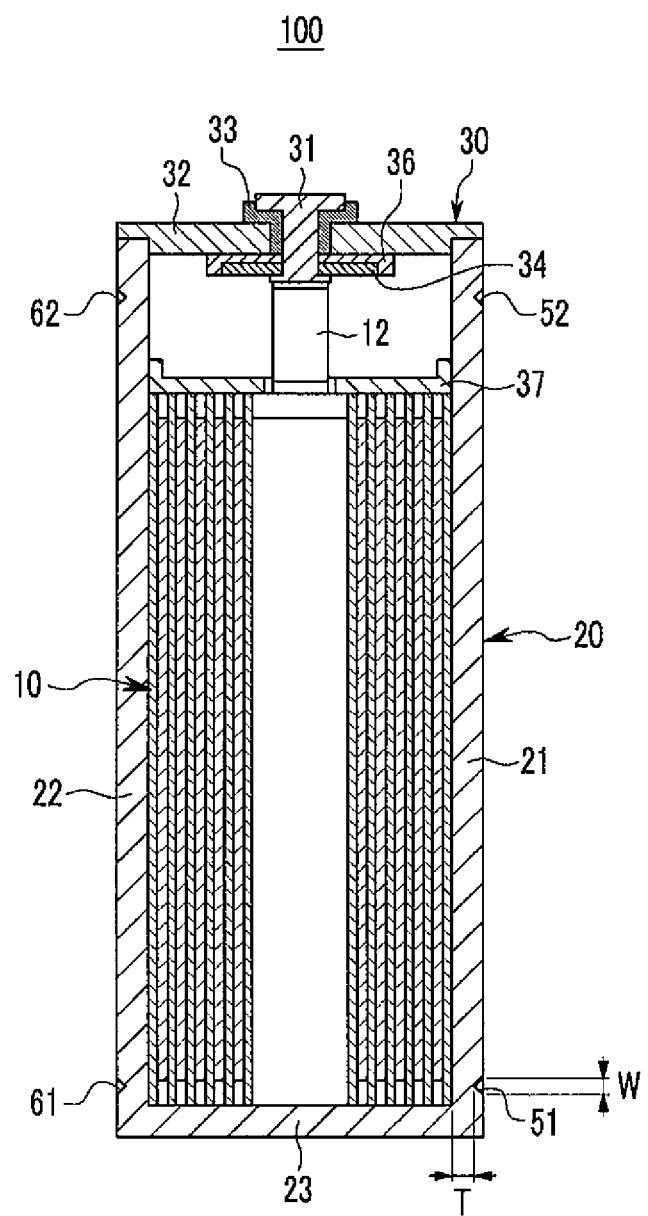
FIG. 3 is a cross-sectional view taken along line III-III in the state in which the rechargeable battery of FIG. 1 is assembled.

FIG. 3 is a cross-sectional view taken along line III-III in the state in which the rechargeable battery of FIG. 1 is assembled, FIG. 4(a) is a front view of the rechargeable battery of FIG. 2, and FIG. 4(b) is a rear view of the rechargeable battery of FIG. 2. With reference to FIGS. 3, 4(a), and 4(b), the can 20 has an angular shape and includes the opening, a first face (referred to as a "front face" or a "first planar surface" hereinafter) 21, a second face (referred to as a "rear face" or a "second planar surface" hereinafter) 22, and a third face (referred to as a "bottom face" or "bottom surface" hereinafter) 23 to form an accommodating space of the electrode assembly 10. In the first exemplary embodiment, the angular can 20 is configured to have sufficient stability to minimize damage the electrode assembly 10 under longitudinal compression.

In one embodiment, the front face 21 and the rear face 22 of the can 20 include at least first fracture portions 51 and 61 in the vicinity of or proximate to the bottom face 23. The first fracture portions 51 and 61 are exemplarily formed as grooves or notches on the front face 21 and the rear face 22 at corresponding positions and spaced from the bottom face 23 to facilitate buckling or fracturing of the front face 21 and the rear face 22 under compression.

The first fracture portions 51 and 61 may be formed on the front face 21 and the rear face 22 and have lengths L51 and L61, respectively, which may be equal to or less than widths W21 and W22 of the front face 21 and the rear face 22 along the widthwise direction. For example, in order for the first fracture portions 51 and 61 to effectively induce the front face 21 and the rear face 22 to be fractured, the lengths L51 and L61 of the first fracture portions 51 and 61 may be about 80 percent or greater of the widths W21 and W22. The first fracture portions 51 and 61 are formed to be substantially symmetrical on the front face 21 and the rear face 22 to thus induce a generally symmetrical deformation of the can 20 in the occurrence of a threshold longitudinal compression.

The can 20 includes the first fracture portions 51 and 61 in the vicinity of the bottom face 23 to correspond to deformation caused by a longitudinal compression. Further, the can 20 may include second fracture portions 52 and 62 in the vicinity of the cap plate 32 to more effectively cope with a deformation caused by a longitudinal compression.

In one embodiment, the front face 21 and the rear face 22 of the can 20 further include the second fracture portions 52 and 62 in the vicinity of the cap plate 32. The second fracture portions 52 and 62 may be exemplarily formed as grooves or notches on the front face 21 and the rear face 22 at corresponding positions spaced from the cap plate 32 to facilitate fracturing of the front face 21 and the rear face 22.

The second fracture portions 52 and 62 are formed on the front face 21 and the rear face 22 and may have lengths L52 and L62, respectively, which may be equal to or less than the widths W21 and W22 of the front face 21 and the rear face 22 along the widthwise direction. For example, in order for the second fracture portions 52 and 62 to effectively induce the front face 21 and the rear face 22 to buckle or fracture, the lengths L52 and L62 of the second fracture portions 52 and 62 may be about 80 percent or greater of the widths W21 and W22. Also, the second fracture portions 52 and 62 are formed to be substantially symmetrical on the front face 21 and the rear face 22 to thus induce a generally symmetrical deformation of the can 20 under longitudinal compression.

In addition, the pair of first fracture portions 51 and 61 in the vicinity of the bottom face 23 and the pair of second fracture portions 52 and 62 in the vicinity of the cap plate 32 are formed to be substantially symmetrical on both sides of the can 20 in a vertical lengthwise direction parallel to length (L) to induce a generally symmetrical deformation under longitudinal compression.

With reference to FIG. 3, the first fracture portions 51 and 61 and the second fracture portions 52 and 62 may have a notch width (W) of between about 0.1 mm to about 0.5 mm, and a thickness (T) of the case at the notch may be between about 0.1 mm to about 0.15 mm. There may be a difference in the material of the can 20, but when the can 20 is made of an aluminum alloy, if the notch width (W) is less than 0.1 mm, a fracture inducement effect may be too weak, and if the notch width (W) is larger than 0.5 mm, the durability of the can 20 could be impaired. If the thickness (T) of the can 20 at the notch is less than 0.1 mm, the durability of the can 20 could be impaired, while if it exceeds 0.15 mm, the fracture inducement effect could be too weak. Thus, in order to facilitate the fracture inducement without degrading the durability of the can 20, the can 20 may be formed such that the notch width (W) is maximized while the thickness (T) of the remaining portion is minimized based on the material of the can 20 and the usage environment of the rechargeable battery 100.

The first fracture portions 51 and 61 are formed to be spaced from the bottom face 23 such that they are positioned within about 10 percent of the vertical length (L) of the can 20, so that when the first fracture portions 51 and 61 buckle or fracture, the bottom face 23 can buckle or fracture without being interfered with by the electrode assembly 10, thus effectively preventing the bottom face 23 from being pushed toward the electrode assembly 10. The second fracture portions 52 and 62 are formed to be spaced from the cap plate 32 such that they are positioned within about 25% of the vertical length (L) of the can 20, so that when the second fracture portions 52 and 62 fracture, the cap plate 32 can be buckled or fractured without being interfered with by the electrode assembly 10, thus effectively preventing the cap plate 32 from being pushed toward the electrode assembly 10.

Figure 4:
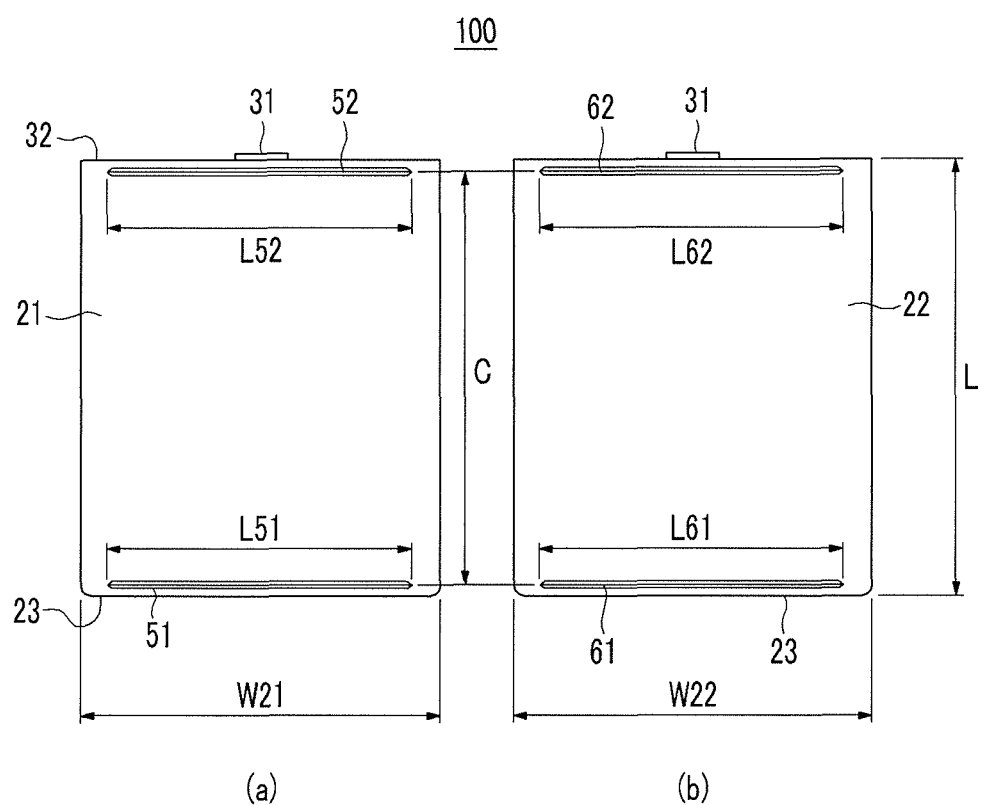
FIG. 4(a) is a front view of the rechargeable battery of FIG. 2.
FIG. 4(b) is a rear view of the rechargeable battery of FIG. 2.
Figure 5:
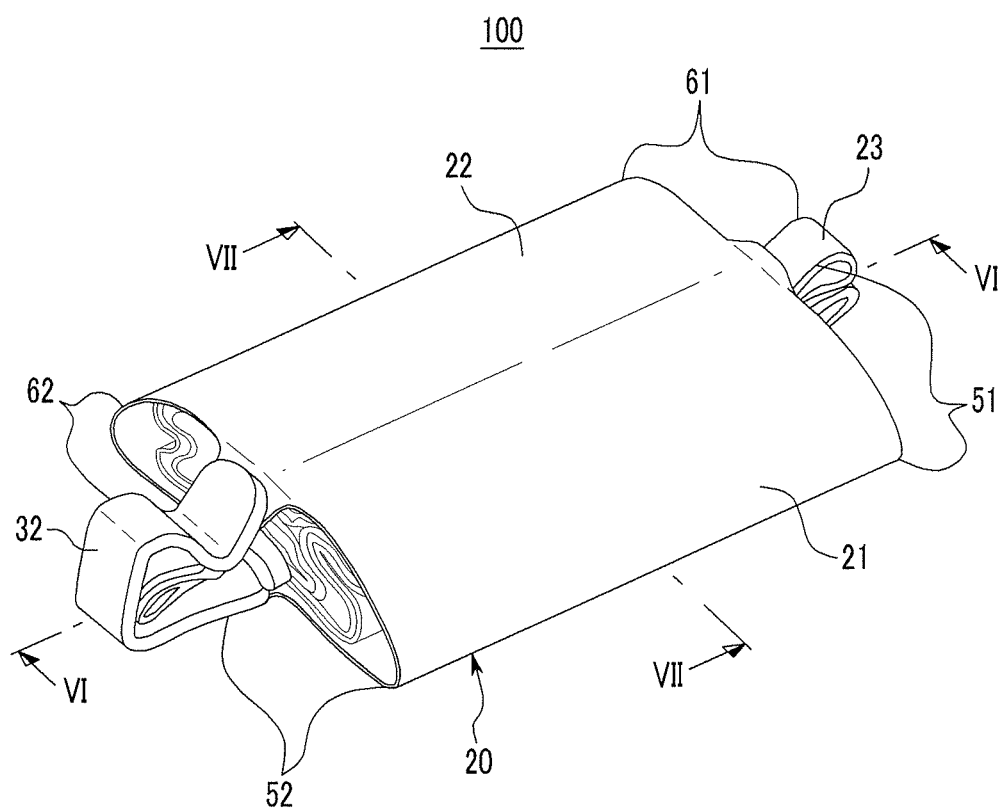
FIG. 5 is a perspective view showing test results of a longitudinal compression of the rechargeable battery of FIG. 4.
Figure 6:
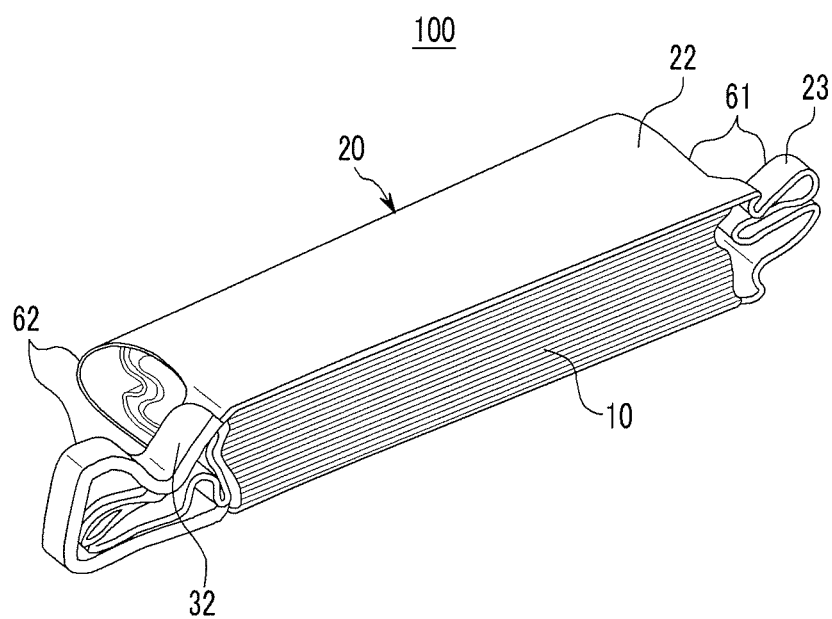
FIG. 6 is a cross-sectional perspective view taken along ling VI-VI in FIG. 5.
Figure 7:
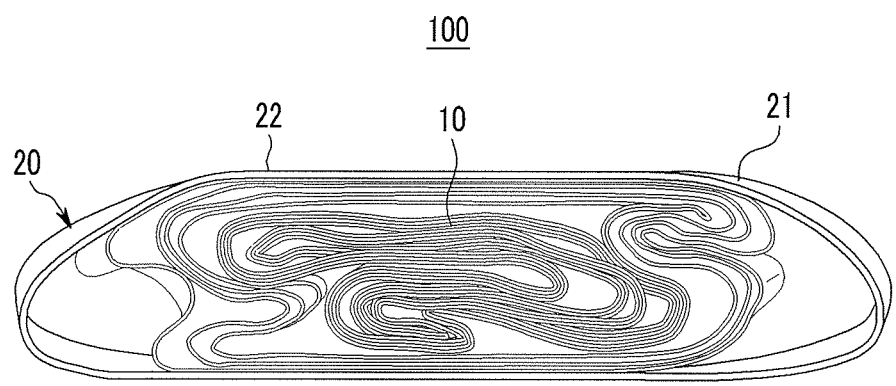
FIG. 7 is a cross-sectional view taken along line VII-VII in FIG. 5.

FIG. 5 is a perspective view showing test results of a longitudinal compression of the rechargeable battery of FIG. 4, FIG. 6 is a cross-sectional perspective view taken along line VI-VI in FIG. 5, and FIG. 7 is a cross-sectional view taken along line VII-VII in FIG. 5. With reference to FIGS. 5 to 7, when the can 20 is compressed and deformed due to a longitudinal compression of the rechargeable battery 100, the first fracture portions 51 and 61 are fractured by the lengths L51 and L61 near the bottom face 23, allowing the bottom face to be folded from the exterior of the can 20. Accordingly, the bottom face 23 can be deformed without being forced into the electrode assembly 10 or damaging the electrode assembly 10. That is, the positive electrode 4 and the negative electrode 6 may not be short-circuited despite deformation of the bottom face 23.

Also, when the can 20 is compressed and deformed due to a longitudinal compression of the rechargeable battery 100, the second fracture portions 52 and 62 are fractured by the lengths L52 and L62 near the cap plate 32, allowing cap plate 32 to be folded from the exterior of the can 20. Accordingly, only the cap plate 32 is deformed without being brought into contact with the electrode assembly 10 or damaging the electrode assembly 10. That is, a short circuit of the positive electrode 4 and the negative electrode 6 can be avoided despite deformation of cap plate 32.

The bottom face 23 is deformed in a state of being tightly attached to the electrode assembly 10, while the cap plate 32 is deformed in a state of being spaced from the electrode assembly 120 with the insulating case 37 located therebetween. When the rechargeable battery 100 is deformed by a longitudinal compression, the cap assembly 30 is less likely to damage the electrode assembly 10 than the bottom face 23. Thus, the front face 21 and the rear face 22 may include one of the first fracture portions 51 and 61 and the second fracture portions 52 and 62, or in the first exemplary embodiment, the front face 21 and the rear face 22 may include both the first fracture portions 51 and 61 and the second fracture portions 52 and 62. In this case, the presence of the first fracture portions 51 and 61 and the second fracture portions can prevent significant damage to the electrode assembly 10 at the portions in the vicinity of the bottom face 23 and the cap plate 32 and also prevent or reduce the likelihood of a short-circuit of the positive electrode 4 and the negative electrode 6.

Various other exemplary embodiments of the present invention will now be described by comparing them with the first exemplary embodiment and foregoing exemplary embodiments of the present invention.

Figure 8:
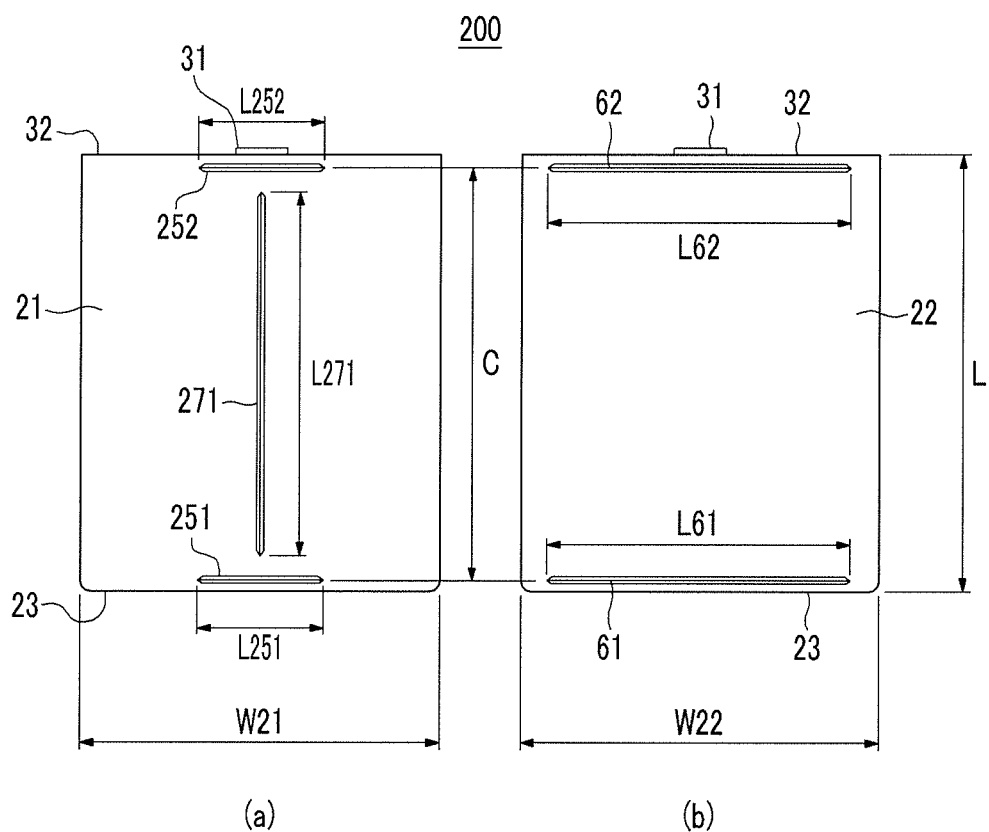
FIG. 8(a) is a front view of a rechargeable battery according to a second exemplary embodiment of the present invention.
FIG. 8(b) is a rear view of the rechargeable battery according to the second exemplary embodiment of the present invention.

FIG. 8(a) is a front view of a rechargeable battery according to a second exemplary embodiment of the present invention, and FIG. 8(b) is a rear view of the rechargeable battery according to the second exemplary embodiment of the present invention. Referring to the first exemplary embodiment of the present invention, the first fracture portions 51 and 61 and the second fracture portions 52 and 62 of the rechargeable battery 100 according to the first exemplary embodiment of the present invention have substantially the same structure. In comparison, with reference to FIG. 8, in the rechargeable battery 200 according to the second exemplary embodiment of the present invention, first fracture portions 251 and 61 have different structures, second fracture portions 252 and 62 have different structures, and a fold portion 271 is formed on the front face 21.

For example, the first and second fracture portions 251 and 252 on the front face 21 are formed to have substantially the same structure, and the first and second fracture portions 61 and 62 on the rear face 22 are formed to have substantially the same structure. The first fracture portions 251 and 61 are formed to be different in the vicinity of the bottom face 23, and the second fracture portions 252 and 62 are formed to be different in the vicinity of the cap plate 32. The pairs of first fracture portions 251 and 61 and second fracture portions 252 and 62 are generally symmetrical.

The first and second fracture portions 61 and 62 on the rear face 22 have the substantially the same shape and substantially the same fracture performance as those in the first exemplary embodiment of the present invention. The first and second fracture portions 251 and 252 on the front face 21 are formed at the central portion of the front face 21 in a widthwise direction, and lengths L251 and L252 of the first and second fracture portions 251 and 252 are shorter than the widths W21 of the front face 21. For example, the lengths L251 and L252 of the first and second fracture portions 251 and 252 on the front face 21 are about 30% of the size of the width W21 of the front face 21 or greater to minimize buckling or fracturing in the vicinity of the bottom face 23 and the cap plate 32.

The fold portion 271 is formed as a notch extending in a vertical lengthwise direction of the can 20 between the first and second fracture portions 251 and 252. The length L271 of the fold portion 271 is longer than the lengths L251 and L252 of the first and second fracture portions 251 and 252 on the front face 21. When the first and second fracture portions 251 and 252 minimize fracturing, the fold portion 271 induces the front face 21 to be folded under longitudinal compression to accelerate fracturing of the first and second fracture portions 61 and 62 on the rear face 22. That is, the presence of the fold portion 271 supplements lower fracturing performance of the first and second fracture portions 251 and 252 that are shorter on the front face 21 through folding of the front face 21 and accelerating fracturing of the rear face 22.

The length L271 of the fold portion 271 may be about 80% or greater of the distance (C) between the first and second fracture portions 251 and 252 of the front face 21. Also, the length L271 may be equal to the distance (C). If the length L271 of the fold portion 271 is less than 80 percent of the distance (C) between the first and second fracture portions 251 and 252, a folding inducement performance of the front face 21 under longitudinal compression could deteriorate and fracturing of the first and second fracture portions 61 and 62 of the rear face 22 may be hampered.

Figure 9:
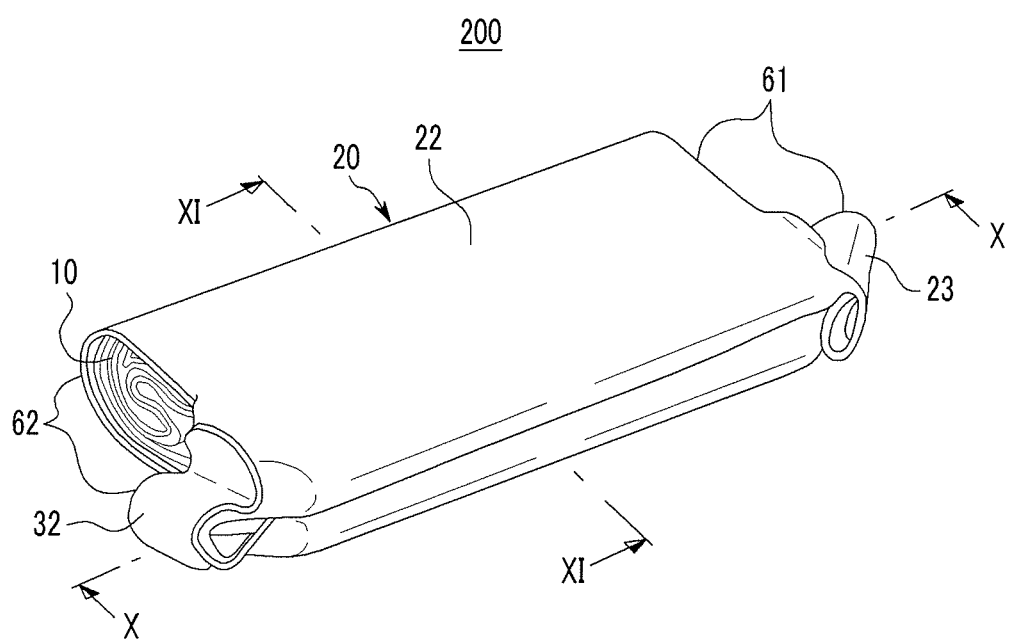
FIG. 9 is a perspective view showing test results of a longitudinal compression of the rechargeable battery of FIG. 8.
Figure 10:
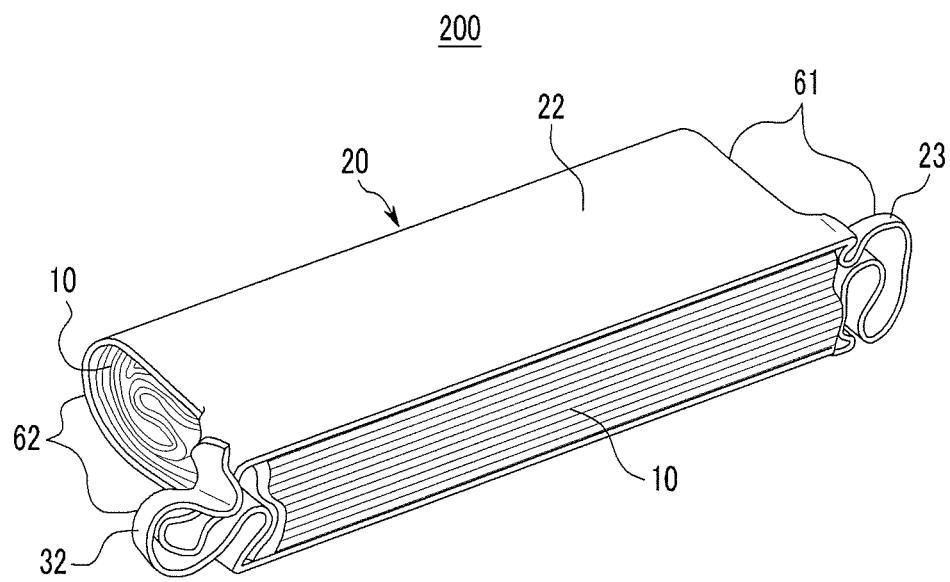
FIG. 10 is a cross-sectional perspective view taken along line X-X in FIG. 9.
Figure 11:
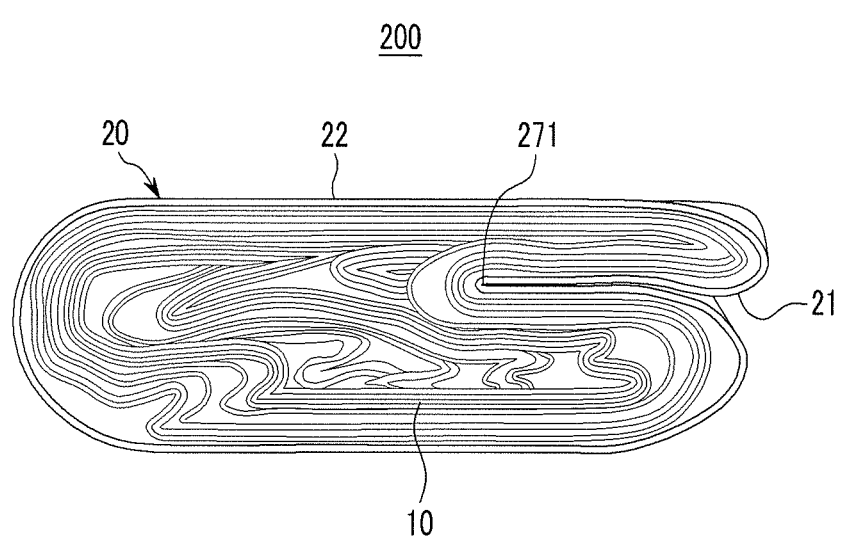
FIG. 11 is a cross-sectional perspective view taken along line XI-XI in FIG. 9.

FIG. 9 is a perspective view showing test results of a longitudinal compression of the rechargeable battery of FIG. 8, FIG. 10 is a cross-sectional perspective view taken along line X-X in FIG. 9, and FIG. 11 is a cross-sectional perspective view taken along line XI-XI in FIG. 9. With reference to FIGS. 8 to 11, when the can 20 is compressed to be deformed by a longitudinal compression of the rechargeable battery 200, the first and second fracture portions 61 and 62 on the rear face 22 are fractured by the lengths L61 and L62 in the vicinity of the bottom face 23 and the cap plate 32, allowing the bottom face 23 and the cap plate 32 to be folded outside the can 20.

Simultaneously, the first and second fracture portions 251 and 252 are fractured by the lengths L251 and L252 in the vicinity of the bottom face 23 and the cap plate 32. Also, because the front face 21 is fractured to be shorter than the rear face 22, it is folded along the fold portion 271 inwardly with respect to the rear face 22 (see FIGS. 9 and 11).

In the rechargeable battery 200 according to the second exemplary embodiment of the present invention, the can 20 is deformed in contact with the electrode assembly 10 at the inner side of the can 20. Because the fold portion 271 formed on the front face 21 of the can 20 accelerates fracturing of the first and second fracture portions 61 and 62 of the rear face 22, a dispersion influence of the notch processing at the first fracture portions 251 and 61 and the second fracture portions 252 and 62 can be reduced. Thus, because only the bottom face 23 and the cap plate 32 are deformed, they are not brought into contact with the electrode assembly 10 nor do they damage the electrode assembly 10. That is, the positive electrode 4 and the negative electrode 6 are not short-circuited by the deformed bottom face 23 and the cap plate 32.

Figure 12:
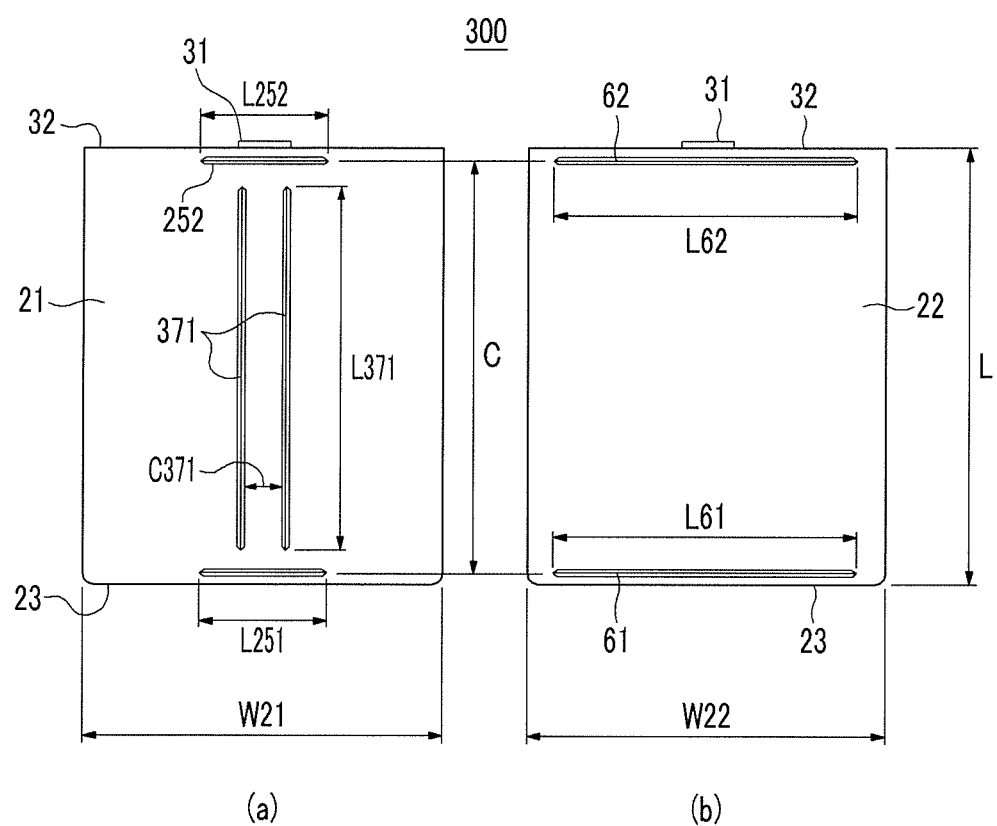
FIG. 12(a) is a front view of a rechargeable battery according to a third exemplary embodiment of the present invention.
FIG. 12(b) is a rear view of the rechargeable battery according to the third exemplary embodiment of the present invention.

FIG. 12(a) is a front view of a rechargeable battery according to a third exemplary embodiment of the present invention, and FIG. 12(b) is a rear view of the rechargeable battery according to the third exemplary embodiment of the present invention. Referring to the rechargeable battery 200 according to the second exemplary embodiment, the fold portion 271 is formed as a single line, but a fold portion 371 of a rechargeable battery 300 according to the third exemplary embodiment of the present invention is formed as two lines. Like the rechargeable battery 200 according to the second exemplary embodiment of the present invention, the rechargeable battery 300 according to the third exemplary embodiment of the present invention includes the first and second fracture portions 251 and 252 formed on the front face 21 and the first and second fracture portions 61 and 62 formed on the rear face 22.

In the rechargeable battery 300 according to the third exemplary embodiment of the present invention, the two-line fold portions 371 are formed to have a substantially symmetrical structure based on a central line extending in a lengthwise direction at the center of the width W21 on the front face 21. The two-line fold portions 371 are formed in the lengthwise direction of the can 20 between the first and second fracture portions 251 and 252 on the front face 21 to induce two areas or at least one area of the front face 21 to be folded under longitudinal compression, further accelerating fracturing of the first and second fracture portions 61 and 62 on the rear face 22. In this case, a space C371 between the fold portions 371 is between about 5 mm and 8 mm. If the space C371 is less than 5 mm, at least one of the two lines is less likely to be folded, and if the space C371 exceeds 8 mm, the front face 21 could be folded asymmetrically or it may be too difficult for the front face 21 to be folded.

Figure 13:
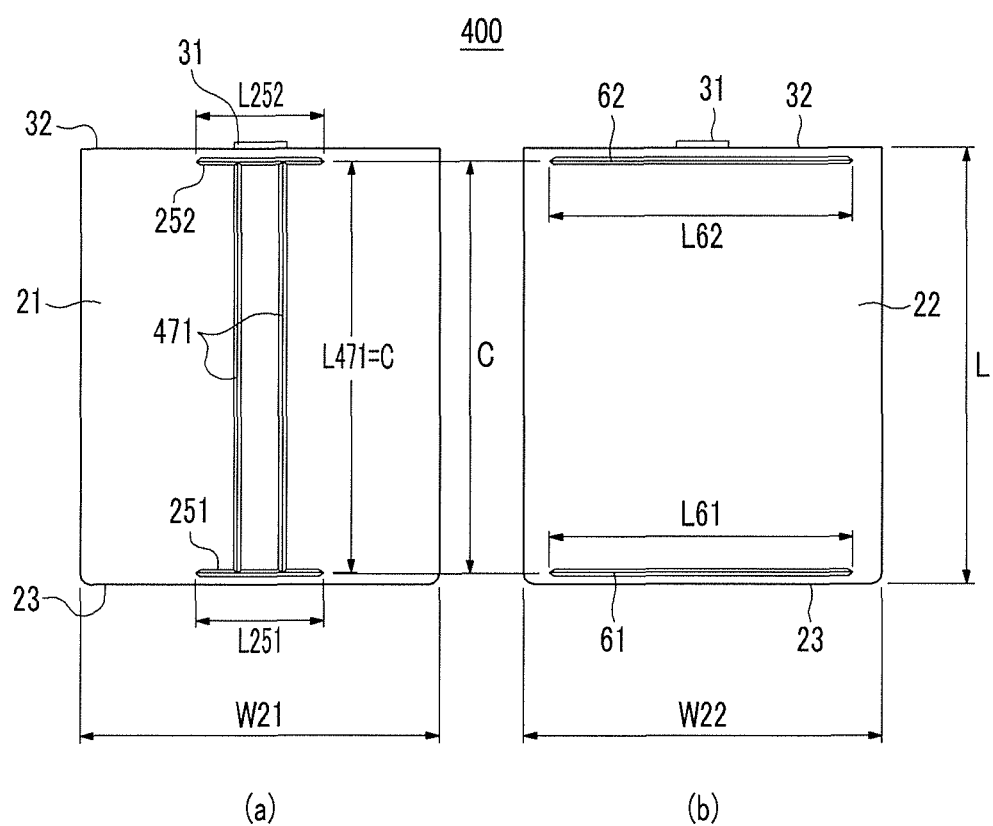
FIG. 13(a) is a front view of a rechargeable battery according to a fourth exemplary embodiment of the present invention.
FIG. 13(b) is a rear view of the rechargeable battery according to the fourth exemplary embodiment of the present invention.

FIG. 13(a) is a front view of a rechargeable battery according to a fourth exemplary embodiment of the present invention, and FIG. 13(b) is a rear view of the rechargeable battery according to the fourth exemplary embodiment of the present invention. Referring to the rechargeable battery 300 according to the third exemplary embodiment of the present invention, the fold portions 371 are formed to be spaced from the first and second fracture portions 251 and 252 of the front face 21. That is, the length L371 of the fold portions 371 is shorter than the distance (C) between the first and second fracture portions 251 and 252. In comparison, in a rechargeable battery 400 according to the fourth exemplary embodiment of the present invention, fold portions 471 are connected with the first and second fracture portions 251 and 252 on the front face 21. That is, a length L471 of the fold portions 471 is substantially equal to the distance (C) between the first and second fracture portions 251 and 252. In the fourth exemplary embodiment of the present invention, the length L471 of the fold portions 471 is longer than the length L371 of the fold portions 371 in the third exemplary embodiment of the present invention, so folding of the front face 21 can be more effectively induced. That is, in the fourth exemplary embodiment of the present invention, the fold portions 471 may cause or induce the front face 21 from the vicinity of the bottom face 23 to the vicinity of the cap plate 32 to be folded.

Figure 14:
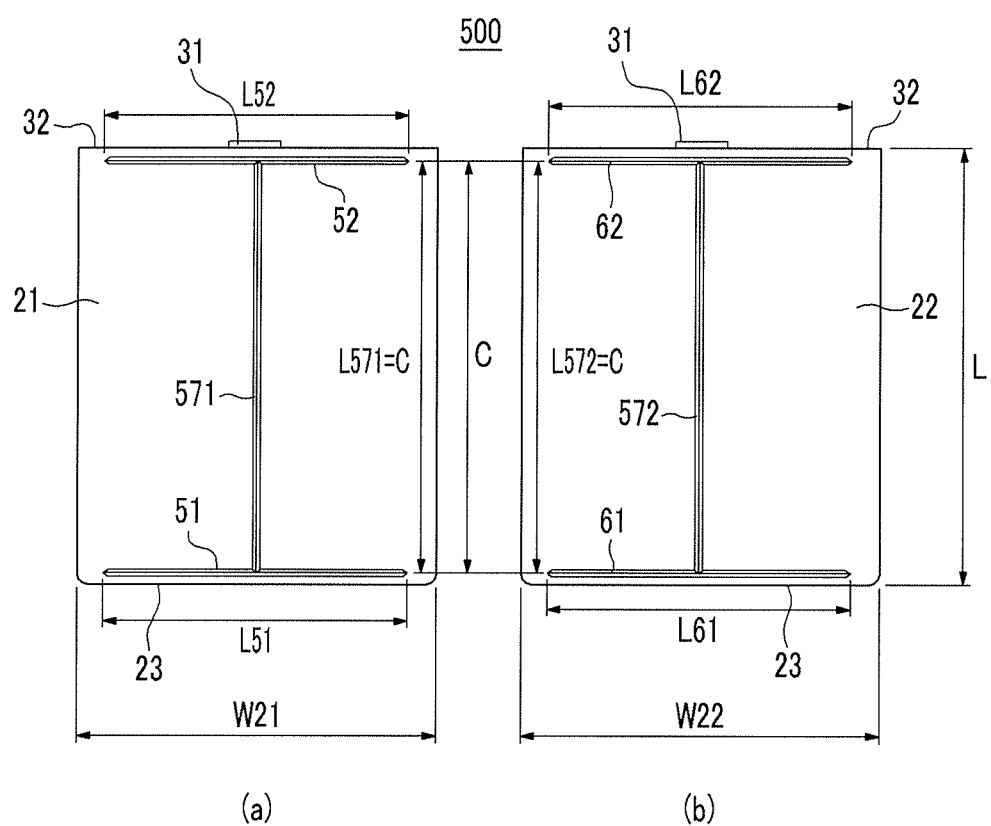
FIG. 14(a) is a front view of a rechargeable battery according to a fifth exemplary embodiment of the present invention.
FIG. 14(b) is a rear view of the rechargeable battery according to the fifth exemplary embodiment of the present invention.

FIG. 14(a) is a front view of a rechargeable battery according to a fifth exemplary embodiment of the present invention, and FIG. 14(b) is a rear view of the rechargeable battery according to the fifth exemplary embodiment of the present invention. With reference to FIG. 14, a rechargeable battery 500 according to the fifth exemplary embodiment of the present invention additionally includes first and second fold portions 571 and 572 in the rechargeable battery 100 according to the first exemplary embodiment of the present invention.

The first fold portion 571 is formed as a groove or notch extending in the vertical lengthwise direction of the can 20 between the first and second fracture portions 51 and 52 at the center of the width W21 on the front face 21. The first fold portion 571 is connected with the first and second fracture portions 51 and 52 of the front face 21. That is, the length L571 of the first fold portion 571 is substantially equal to the distance (C) between the first and second fracture portions 51 and 52.

The second fold portion 572 is formed as a notch extending in the vertical lengthwise direction of the can 20 between the first and second fracture portions 61 and 62 at the center of the width W22 on the rear face 22. The second fold portion 572 is connected to the first and second fracture portions 61 and 62 of the rear face 22. That is, the length L572 of the second fold portion 572 is equal to the distance (C) between the first and second fracture portions 61 and 62.

Under longitudinal compression, the first fold portion 571 induces the front face 21 to be folded from the vicinity of the bottom face 23 to the vicinity of the cap plate 32 to accelerate fracturing of the first and second fracture portions 61 and 62 on the rear face 22. Additionally, under longitudinal compression, the second fold portion 572 induces the rear face 22 to be folded from the vicinity of the bottom face 23 to the vicinity of the cap plate 32 to accelerate fracturing of the first and second fracture portions 51 and 52 on the front face 21. That is, when the rechargeable battery 500 undergoes longitudinal compression according to the fifth exemplary embodiment of the present invention, the front face 21 or the rear face 22 may be folded to be turned toward an inner side or an outer side.

FIG. 15(a) is a front view of a rechargeable battery according to a sixth exemplary embodiment of the present invention, and FIG. 15(b) is a rear view of the rechargeable battery according to the sixth exemplary embodiment of the present invention. Referring to the rechargeable battery 500 according to the fifth exemplary embodiment of the present invention, the first and second fold portions 571 and 572 connect the first and second fracture portions 51 and 52 of the front face and the first and second fracture portions 61 and 62 of the rear face 22. In comparison, in a rechargeable battery 600 according to the sixth exemplary embodiment of the present invention, first and second fold portions 671 and 672 are spaced from the first and second fracture portions 51 and 52 of the front face 21 and spaced from the first and second fracture portions 61 and 62 of the rear face 22.

Figure 15:
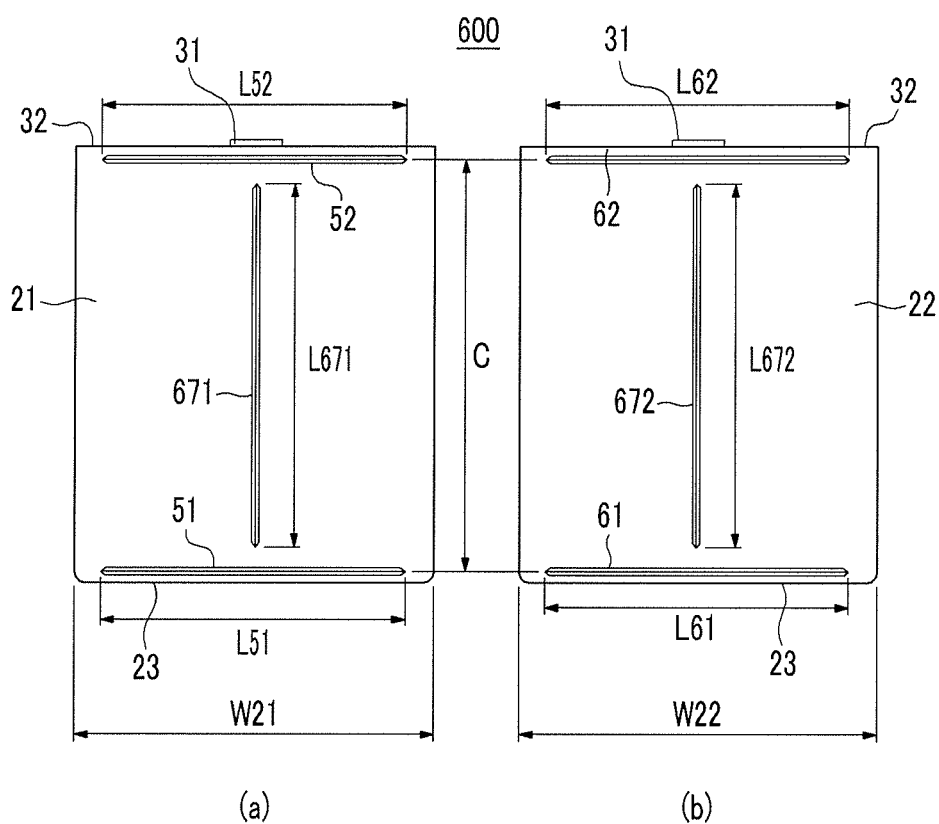
FIG. 15(a) is a front view of a rechargeable battery according to a sixth exemplary embodiment of the present invention.
FIG. 15(b) is a rear view of the rechargeable battery according to the sixth exemplary embodiment of the present invention.

With reference to FIG. 15, in the rechargeable battery 600 according to the sixth exemplary embodiment of the present invention, a length L671 of the first fold portion 671 is shorter than the distance (C) between the first and second fracture portions 51 and 52, and a length L672 of the second fold portion 672 is shorter than the distance (C) between the first and second fracture portions 61 and 62.

In the occurrence of a longitudinal compression, the first fold portion 671 induces the front face 21 to be folded to accelerate fracturing of the first and second fracture portions 61 and 62 on the rear face 22, and the second fold portion 672 induces the rear face 22 to be folded to accelerate fracturing of the first and second fracture portions 51 and 52 on the front face 21. That is, when a longitudinal compression occurs to the rechargeable battery 600 according to the sixth exemplary embodiment of the present invention, the front face 21 or the rear face 22 may be folded to be turned towards an inner side or an outer side.

FIG. 16(a) is a front view of a rechargeable battery according to a seventh exemplary embodiment of the present invention, and FIG. 16(b) is a rear view of the rechargeable battery according to the seventh exemplary embodiment of the present invention. Referring to the rechargeable battery 200 according to the second exemplary embodiment of the present invention, the fold portion 271 is spaced from the first and second fracture portions 251 and 252 on the front face 21. In comparison, in a rechargeable battery 700 according to the seventh exemplary embodiment of the present invention, a fold portion 771 is connected to the first and second fracture portions 251 and 252 on the front face 21.

Figure 16:
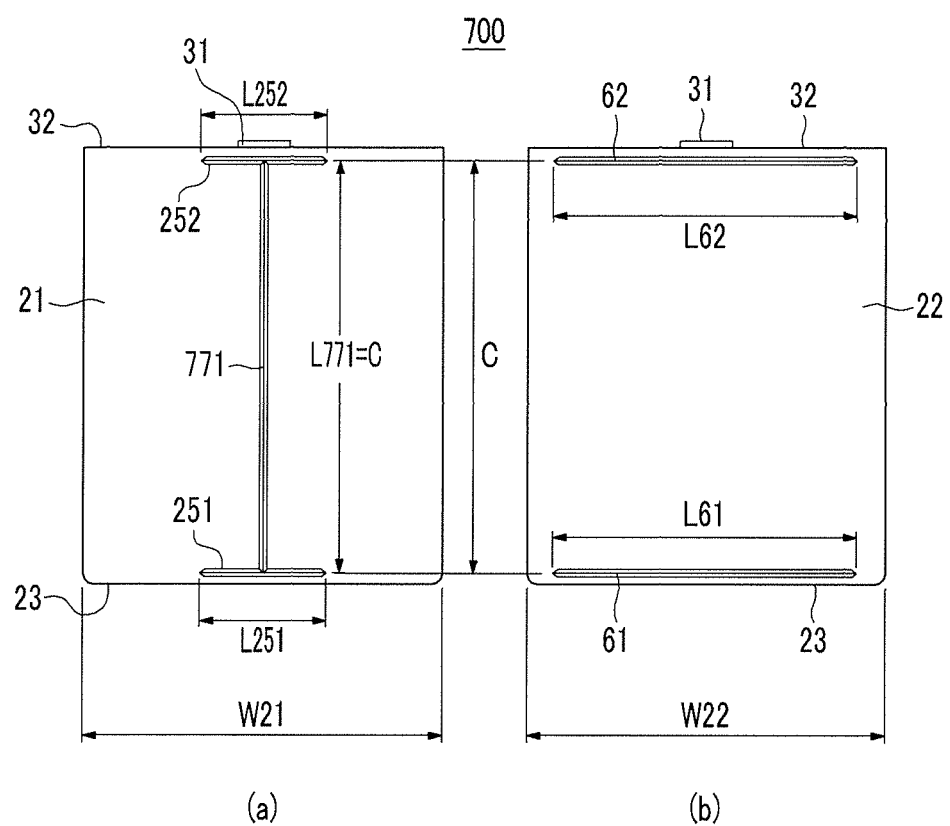
FIG. 16(a) is a front view of a rechargeable battery according to a seventh exemplary embodiment of the present invention.
FIG. 16(b) is a rear view of the rechargeable battery according to the seventh exemplary embodiment of the present invention.

With reference to FIG. 16, in the rechargeable battery 700 according to the seventh exemplary embodiment of the present invention, the fold portion 771 has a length L771 which is substantially equal to the distance (C) between the first and second fracture portions 251 and 252, to thus effectively cause the front face 21 to be folded, compared with the second exemplary embodiment of the present invention. That is, according to the seventh exemplary embodiment of the present invention, the fold portion 771 induces the front face 21 to be folded from the vicinity of the bottom face 23 to the vicinity of the cap plate 32.

FIG. 17(a) is a front view of a rechargeable battery according to an eighth exemplary embodiment of the present invention, and FIG. 17(b) is a rear view of the rechargeable battery according to the eighth exemplary embodiment of the present invention. Referring to the rechargeable battery 200 according to the second exemplary embodiment of the present invention, the fold portion 271 is spaced from the first and second fracture portions 251 and 252 on the front face 21. In comparison, in a rechargeable battery 800 according to the eighth exemplary embodiment of the present invention, a fold portion 871 is spaced from the first fracture portion 251 on the front face 21 and connected to the second fracture portion 252 on the front face 21.

Figure 17:
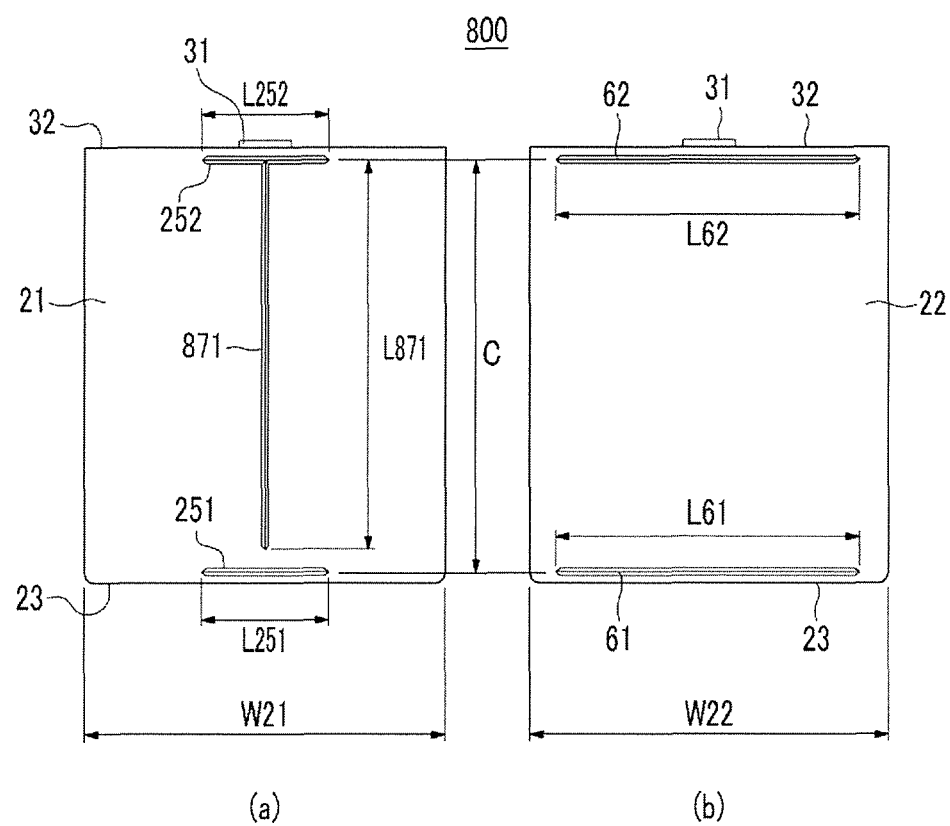
FIG. 17(a) is a front view of a rechargeable battery according to an eighth exemplary embodiment of the present invention.
FIG. 17(b) is a rear view of the rechargeable battery according to the eighth exemplary embodiment of the present invention.

With reference to FIG. 17, in the rechargeable battery 800 according to the eighth exemplary embodiment of the present invention, the fold portion 971, having a length L871 shorter than the distance (C) between the first and second fracture portions 251 and 252, induces the front face 21 to be folded. In the eighth exemplary embodiment of the present invention, because the fold portion 871 induces the front face 21 to be folded up to the vicinity of the cap plate 32, more of the front face 21 can be folded in the vicinity of the cap plate 32 than in the vicinity of the bottom face 23.

FIG. 18(a) is a front view of a rechargeable battery according to a ninth exemplary embodiment of the present invention, and FIG. 18(b) is a rear view of the rechargeable battery according to the ninth exemplary embodiment of the present invention. Referring to the rechargeable battery 200 according to the second exemplary embodiment of the present invention, the fold portion 271 is spaced from the first and second fracture portions 251 and 252 on the front face 21. In comparison, in a rechargeable battery 900 according to the ninth exemplary embodiment of the present invention, a fold portion 971 is spaced from the second fracture portion 252 on the front face 21 and connected with the first fracture portion 251 on the front face 21.

Figure 18:
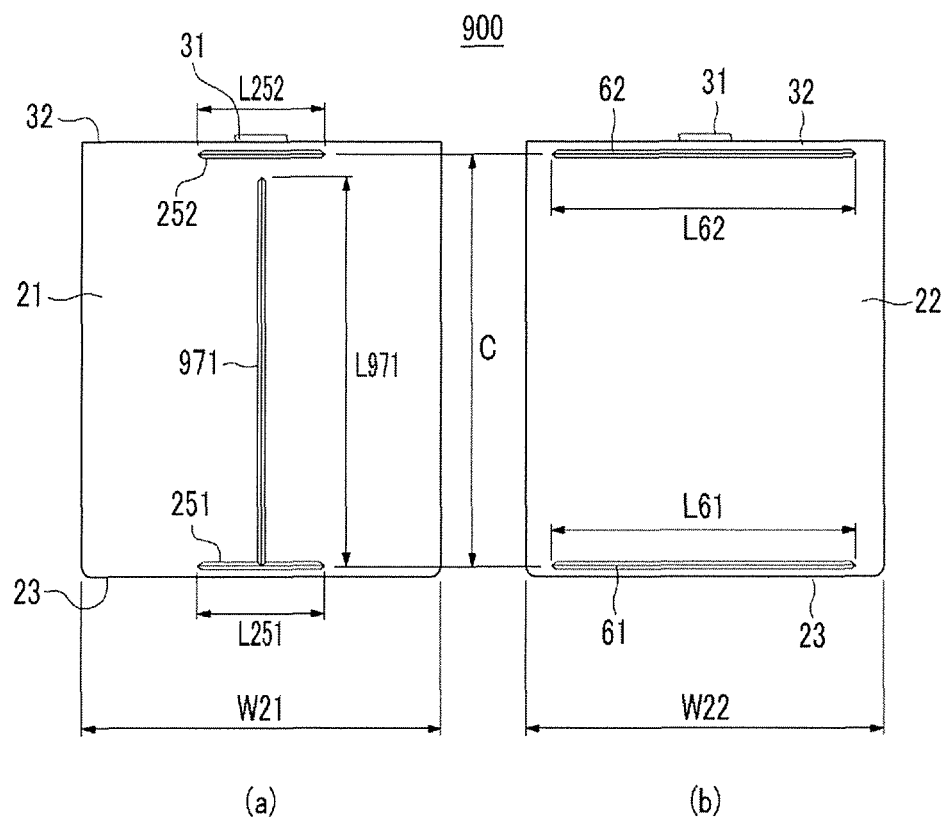
FIG. 18(a) is a front view of a rechargeable battery according to a ninth exemplary embodiment of the present invention.
FIG. 18(b) is a rear view of the rechargeable battery according to the ninth exemplary embodiment of the present invention.

With reference to FIG. 18, in the rechargeable battery 900 according to the ninth exemplary embodiment of the present invention, the fold portion 971, having a length L971 shorter than the distance (C) between the first and second fracture portions 251 and 252, induces the front face 21 to be folded. In the ninth exemplary embodiment of the present invention, because the fold portion 971 induces the front face 21 to be folded up to the vicinity of the bottom face 23, more of the front face 21 can be folded in the vicinity of the bottom face 23 than in the vicinity of the cap plate 32.

FIG. 19(a) is a front view of a rechargeable battery according to a tenth exemplary embodiment of the present invention, and FIG. 19(b) is a rear view of the rechargeable battery according to the tenth exemplary embodiment of the present invention. Referring to the rechargeable battery 300 according to the third exemplary embodiment of the present invention, the fold portions 371 formed as two lines are spaced from the first and second fracture portions 251 and 252 on the front face 21. In comparison, in a rechargeable battery 1000 according to the tenth exemplary embodiment of the present invention, fold portions 1071 formed as two lines are spaced from the first fracture portion 251 on the front face 21 and connected with the second fracture portion 252 on the front face 21.

Figure 19:
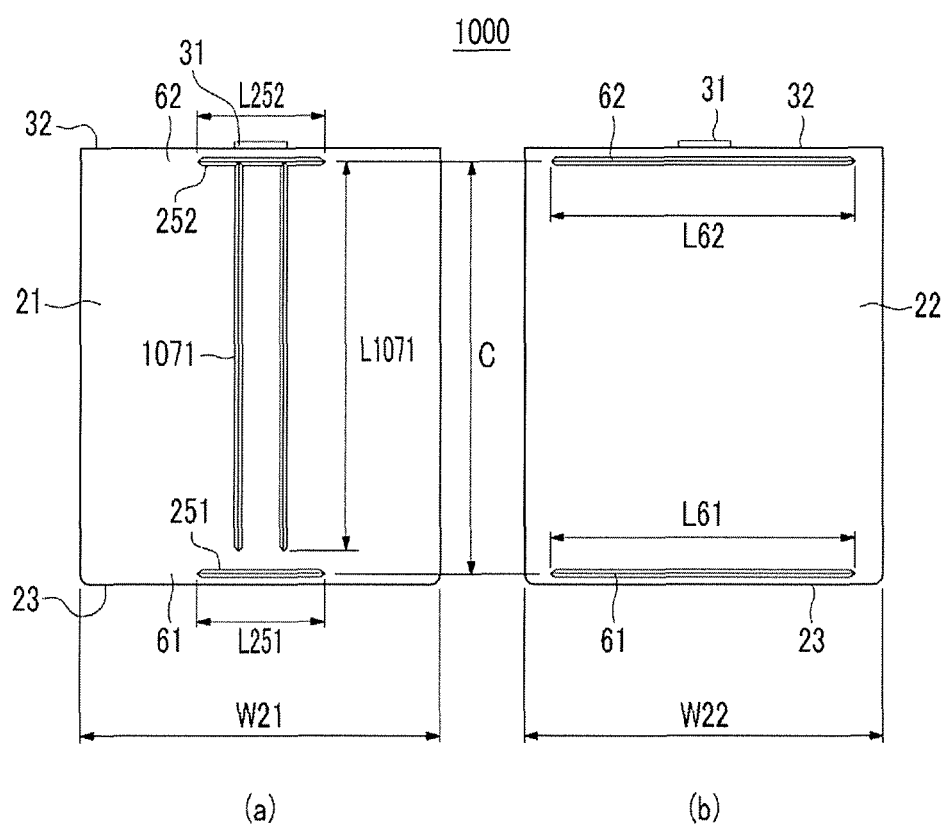
FIG. 19(a) is a front view of a rechargeable battery according to a tenth exemplary embodiment of the present invention.
FIG. 19(b) is a rear view of the rechargeable battery according to the tenth exemplary embodiment of the present invention.

With reference to FIG. 19, in the rechargeable battery 1000 according to the tenth exemplary embodiment of the present invention, the fold portions 1071, having a length L1071 shorter than the distance (C) between the first and second fracture portions 251 and 252, induce the front face 21 to be folded. In the tenth exemplary embodiment of the present invention, because the fold portions 1071 induce the front face 21 to be folded up to the vicinity of the cap plate 32, more of the front face 21 can be folded in the vicinity of the cap plate 32 than in the vicinity of the bottom face 23.

FIG. 20(a) is a front view of a rechargeable battery according to an eleventh exemplary embodiment of the present invention, and FIG. 20(b) is a rear view of the rechargeable battery according to the eleventh exemplary embodiment of the present invention. Referring to the rechargeable battery 300 according to the third exemplary embodiment of the present invention, the fold portions 371 formed as two lines are spaced from the first and second fracture portions 251 and 252 on the front face 21. In comparison, in a rechargeable battery 1100 according to the eleventh exemplary embodiment of the present invention, fold portions 1171 formed as two lines are connected to the first fracture portion 251 on the front face 21 and spaced from the second fracture portion 252 on the front face 21.

Figure 20:
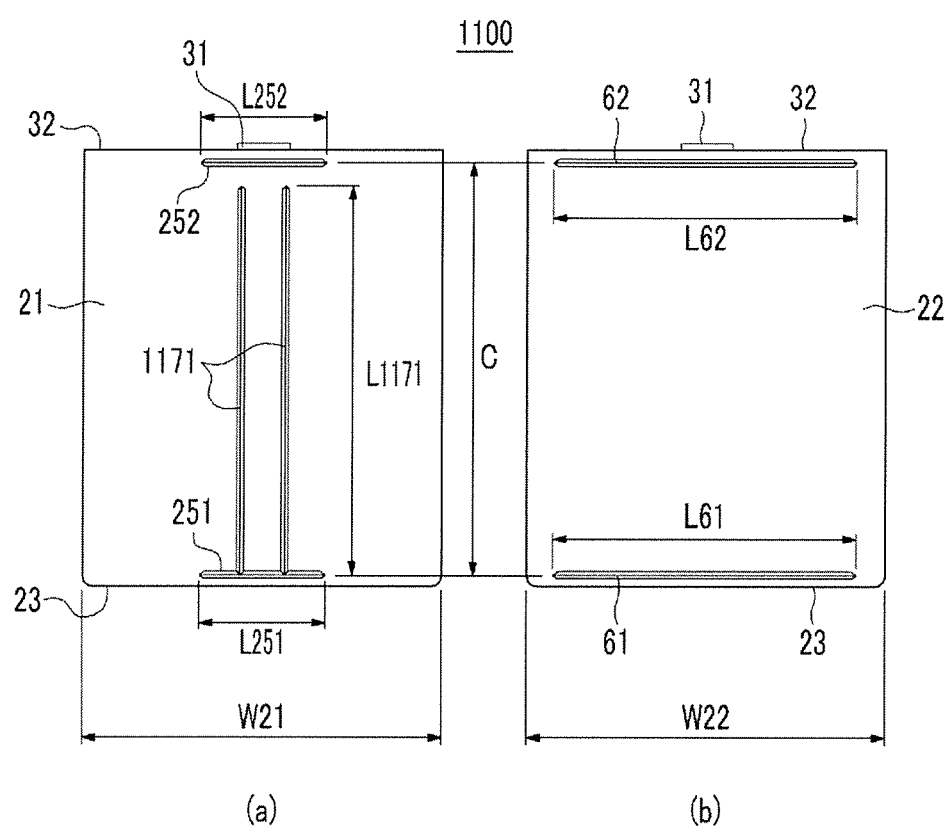
FIG. 20(a) is a front view of a rechargeable battery according to an eleventh exemplary embodiment of the present invention.
FIG. 20(b) is a rear view of the rechargeable battery according to the eleventh exemplary embodiment of the present invention.

With reference to FIG. 20, in the rechargeable battery 1100 according to the eleventh exemplary embodiment of the present invention, the fold portions 1171, having a length L1171 shorter than the distance (C) between the first and second fracture portions 251 and 252, induce the front face 21 to be folded. In the eleventh exemplary embodiment of the present invention, because the fold portions 1171 induce the front face 21 to be folded up to the vicinity of the bottom face 23, more of the front face 21 can be folded in the vicinity of the bottom face 23 than in the vicinity of the cap plate 32.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Symbols | |
|---|---|
| 100, 200, 300, 400, 500, 600, 700, 800, 900, 1000, 1100: rechargeable battery | |
| 2: separator | 4: positive electrode |
| 6: negative electrode | 10: electrode assembly |
| 20: can | 21: first face (front face) |
| 22: second face (rear face) | 23: third face (bottom face) |
| 30: cap assembly | 31: electrode terminal |
| 32: cap plate | 33: Insulating gasket |
| 32a: terminal hole | 34: terminal plate |
| 36: insulating plate | 37: insulating case |
| 51, 61, 251: first fracture portion | |
| 52, 62, 252: second fracture portion | |
| 271, 371, 471, 771, 871, 971, 1071, 1171: fold portion | |
| 571, 671: first fold portion | 572, 672: second fold portion |
| C: distance | L: vertical length |
| L51, L61, L251, L252, L271, L371, L471, L571, L572, L671, L672, L771, L871, L971, L1071, L1171: length | |
| T: thickness of remaining portion | |
| W: notch width | W21, W22: width |

What is claimed is:

1. A rechargeable battery comprising:
an electrode assembly;
a can housing the electrode assembly and having an open end, a bottom surface substantially opposite to the open end, a first planar surface, and a second planar surface, wherein the first planar surface and the second planar surface each have a first fracture portion and a second fracture portion that facilitates buckling of the can under compression, wherein the first planar surface has a first fold portion extending along a first axis and spaced from the first fracture portion and the second fracture portion of the first planar surface, wherein the first axis is defined extending from the bottom surface to the open end, wherein the second fracture portion of the first planar surface and of the second planar surface is located proximate to the open end of the can and extends along a second axis in a direction perpendicular to the first axis, wherein the first fracture portion of the first planar surface and of the second planar surface is located proximate to and spaced from the bottom surface of the can; and
a cap plate sealing the open end of the can.

2. The rechargeable battery of claim 1, wherein the first fracture portion of the first planar surface and of the second planar surface is a groove.

3. The rechargeable battery of claim 1, wherein the first fracture portion on the first planar surface substantially corresponds to the first fracture portion on the second planar surface.

4. The rechargeable battery of claim 1, wherein the first fracture portion of the first planar surface and of the second planar surface is located proximate the bottom surface within 10% of a length of the can.

5. The rechargeable battery of claim 1, wherein a length of the first fracture portion of the first planar surface and of the second planar surface is at least about 30% of a width of the first planar surface.

6. The rechargeable battery of claim 1, wherein a length of the first fracture portion of the first planar surface and of the second planar surface is at least about 80% of a width of the first planar surface.

7. The rechargeable battery of claim 1, wherein a width of the first fracture portion of the first planar surface and of the second planar surface is between about 0.1 mm and about 0.5 mm.

8. The rechargeable battery of claim 1, wherein a thickness of the can at the first fracture portion of the first planar surface and of the second planar surface is between about 0.1 mm and about 0.15 mm.

9. The rechargeable battery of claim 1, wherein the second fracture portion of the first planar surface and of the second planar surface is proximate the open end of the can.

10. The rechargeable battery of claim 9, wherein the second fracture portion of the first planar surface and of the second planar surface is located proximate the open end within 10% of a length of the can and the first fracture portion of the first planar surface and of the second planar surface is located proximate the bottom surface within 25% of the length of the can.

11. The rechargeable battery of claim 1, wherein the first fold portion has a length of at least 80% of a distance between the first fracture portion and the second fracture portion of the first planar surface.

12. The rechargeable battery of claim 1, wherein the first fold portion comprises a plurality of grooves extending parallel to each other.

13. The rechargeable battery of claim 1, further comprising a second fold portion on the second planar surface.

14. The rechargeable battery of claim 13, wherein the second fold portion substantially corresponds to the first fold portion.

* * * * *